(12) United States Patent　　　(10) Patent No.:　US 12,664,362 B2
Li et al.　　　　　　　　　　　　(45) Date of Patent:　Jun. 23, 2026

(54) DOMAIN DICTIONARY CONSTRUCTING METHOD AND APPARATUS

(71) Applicant: MaShang Consumer Finance Co., Ltd., Chongqing (CN)

(72) Inventors: Changlin Li, Chongqing (CN); Quan Lu, Chongqing (CN); Bing Xiao, Chongqing (CN); Lei Cao, Chongqing (CN); Qishuai Luo, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 165 days.

(21) Appl. No.: 18/676,154

(22) Filed: May 28, 2024

(65) Prior Publication Data

US 2024/0320426 A1　　Sep. 26, 2024

(30) Foreign Application Priority Data

Jun. 28, 2023　(CN) .......................... 202310774548.0

(51) Int. Cl.
　*G06F 40/242*　　　(2020.01)
　*G06F 40/205*　　　(2020.01)
(52) U.S. Cl.
　CPC .......... *G06F 40/242* (2020.01); *G06F 40/205* (2020.01)
(58) Field of Classification Search
　None
　See application file for complete search history.

(56) References Cited

U.S. PATENT DOCUMENTS

| 8,386,240 B2 * | 2/2013 | Wu ........................ | G06F 40/258 704/10 |
| 2009/0055381 A1 * | 2/2009 | Wu ........................ | G06F 40/258 707/999.005 |
| 2016/0065534 A1 * | 3/2016 | Liu ........................ | G06F 16/951 707/728 |
| 2018/0173696 A1 * | 6/2018 | Hosabettu ............... | G06F 16/36 |
| 2024/0394291 A1 * | 11/2024 | Nelson .................... | G06F 40/30 |

OTHER PUBLICATIONS

Jurafsky, Daniel et al., "Speech and Language Processing", An Introduction to Natural Language Processing, Computation Linguistics, and Speech Recognition, Third Edition Draft, Oct. 16, 2019, 621 pages.

* cited by examiner

*Primary Examiner* — Douglas Godbold
(74) *Attorney, Agent, or Firm* — Davis Wright Tremaine LLP

(57)　　　　ABSTRACT

The present disclosure provides a domain dictionary constructing method and apparatus, the method including: segmenting a domain corpus sample to obtain a first character segment set, where the first character segment set includes at least one first character segment; calculating an inter-character correlation index of the at least one first character segment; determining a second character segment set according to the correlation index, where the second character segment set includes a first character segment of which the correlation index is greater than or equal to a preset threshold; determining a third character segment set according to the second character segment set, where the third character segment set includes the second character segment set and second character segments of the domain corpus; constructing a domain dictionary according to the third character segment set.

18 Claims, 2 Drawing Sheets

Segmenting a domain corpus sample to obtain a first character segment set — 201

Calculating an inter-character correlation index of the at least one first character segment — 202

Determining a second character segment set according to the correlation index — 203

Determining a third character segment set according to the second character segment set — 204

Constructing a domain dictionary according to the third character segment set — 205

DOMAIN DICTIONARY CONSTRUCTING METHOD AND APPARATUS

CROSS-REFERENCE TO RELATED APPLICATIONS

This application claims priority to Chinese Patent Application No. 202310774548.0, entitled "DOMAIN DICTIONARY CONSTRUCTING METHOD AND APPARATUS," filed on Jun. 28, 2023, the disclosure of which is hereby incorporated by reference in its entirety.

TECHNICAL FIELD

The present disclosure relates to the field of language processing technology and, in particular, to a domain dictionary constructing method and apparatus.

BACKGROUND

Word is an important language unit in a language system, words and expressions are foundations for text processing and have richer expressive abilities in semantic representation than characters. Words and expressions have domain characteristic, and different domains have different vocabulary systems. For example, there are significant differences among military, medical, public security, and financial domains. This domain characteristic can be used for domain classification, domain labeling, domain differentiation, keyword extraction, and feature word extraction, and a construction of a knowledge graph and a knowledge system such as construction of an ontology and an instance system can also be supported. On the other hand, multiple tasks such as extraction of domain words, extraction of semantic associations between domain words, expansion of domain words, and construction domain word knowledge bases have also been proposed.

Different domain dictionaries or domain lexicons can support different applications. For example, the domain dictionaries can be subdivided into six types: a domain feature dictionary, a domain stop dictionary, a domain sentiment dictionary, a domain abstract dictionary, a domain semantic dictionaries, and a domain event lexicon. Currently, a commonly used method for constructing a domain dictionary is a statistical-based domain dictionary constructing method. For example, as shown in FIG. 1, step 1, annotate a domain text by accumulated domain words; step 2, train models such as LSTM and BERT by using an entity recognition task; step 3, identify domain words in data to be recognized by using a trained model; step 4, filter the domain words identified in the step 3 by means of confidence, word frequency, etc.; step 5, add the filtered domain words into the domain dictionary. It can be seen that the above statistical-based domain dictionary constructing method not only requires a certain accumulation of domain words and manual annotation, but also requires a high recognition accuracy of the model. That is to say, the existing domain dictionary constructing method not only has low efficiency, but also has limited usage conditions.

SUMMARY

Embodiments of the present disclosure provides a domain dictionary constructing method and apparatus to solve the problem of low efficiency and limited usage conditions in constructing a domain dictionary in prior art.

In order to solve the above technical problem, the present disclosure is implemented as follows.

In a first aspect, an embodiment of the present disclosure provides a domain dictionary constructing method, including:

segmenting a domain corpus sample to obtain a first character segment set, where the first character segment set includes at least one first character segment;

calculating an inter-character correlation index of the at least one first character segment;

determining a second character segment set according to the correlation index, where the second character segment set includes a first character segment of which the correlation index is greater than or equal to a preset threshold;

determining a third character segment set according to the second character segment set, where the third character segment set includes the second character segment set and second character segments of the domain corpus sample, where each of the second character segments is a character segment that is the same as a character segment obtained by combining at least two character segments of the second character segment set;

constructing a domain dictionary according to the third character segment set.

In a second aspect, an embodiment of the present disclosure provides a domain dictionary constructing apparatus, including:

a segmenting module, configured to segment a domain corpus sample to obtain a first character segment set, where the first character segment set includes at least one first character segment;

a first calculating module, configured to calculate an inter-character correlation index of the at least one first character segment;

a first determining module, configured to determine a second character segment set according to the correlation index, where the second character segment set includes a first character segment of which the correlation index is greater than or equal to a preset threshold;

a second determining module, configured to determine a third character segment set according to the second character segment set, where the third character segment set includes the second character segment set and second character segments of the domain corpus sample, where each of the second character segments is a character segment that is the same as a character segment obtained by combining at least two character segments of the second character segment set;

a constructing module, configured to construct a domain dictionary according to the third character segment set.

In a third aspect, an embodiment of the present disclosure provides an electronic device, including: a processor, a memory and a computer program stored in the memory and capable of running on the processor, and when the computer program is executed by the processor, steps of the above domain dictionary constructing method are implemented.

In a fourth aspect, an embodiment of the present disclosure provides a computer-readable storage medium, storing a computer program therein, and when the computer program is executed by a processor, steps of the above domain dictionary constructing method are implemented.

In the embodiments of the present disclosure, a domain corpus sample is segmented to obtain a first character segment set, which includes at least one first character segment; an inter-character correlation index of the at least one first character segment is calculated; a second character segment set is determined according to the correlation index, where the second character segment set includes a first character segment of which the correlation index is greater than or equal to a preset threshold; a third character segment set is determined according to the second character segment set, where the third character segment set includes the second character segment set and second character segments of the domain corpus sample, where each of the second character segments is a character segment that is the same as a character segment obtained by combining at least two character segments of the second character segment set; a domain dictionary can be constructed according to the third character segment set. As can be seen from the above, the embodiments of the present application can achieve mining and construction for the domain dictionary without an accumulation of domain words and manual annotation for domain words, which is not only relatively simple to implement but also improves an efficiency of constructing the domain dictionary. In addition, by performing filtering processes such as calculating the inter-character correlation index of each first character segment and comparing them with a preset threshold, an accuracy of mined domain words can be ensured. Moreover, by taking a character segment that is the same as a character segment obtained by combining at least two character segments of the second character segment set also as the mined domain word, the domain words mined from the domain corpus sample can be expanded and an omission of domain words in the domain corpus sample can be reduced.

BRIEF DESCRIPTION OF DRAWINGS

To describe the technical solutions in embodiments of the present disclosure more clearly, the following briefly introduces the accompanying drawings needed for describing the embodiments of the present disclosure. Apparently, the accompanying drawings in the following description are only part of embodiments of the present disclosure, and persons of ordinary skill in the art may still derive other drawings from these accompanying drawings without creative effort.

DESCRIPTION OF EMBODIMENTS

Technical solutions in the embodiments of the present disclosure will be clearly and completely described below in combination with the accompanying drawings of the embodiments of the present disclosure. It is clear that the embodiments described are a part of the embodiments of the present disclosure, and not all of them. Based on the embodiments in the present disclosure, all other embodiments obtained by persons of ordinary skill in the art without creative effort fall within the scope of protection of the present disclosure.

Figure 1:
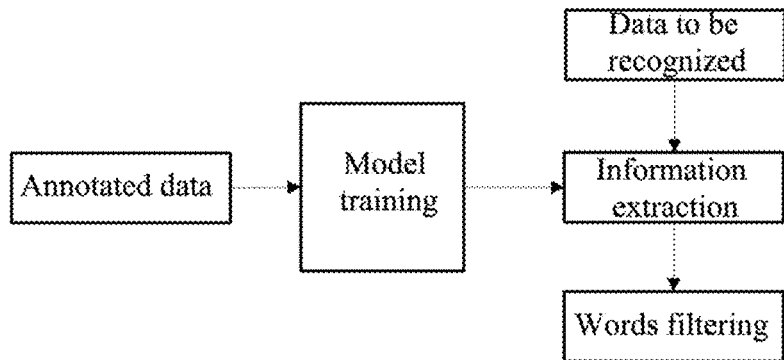
FIG. 1 is a schematic diagram of constructing a domain dictionary provided by relevant arts.
Figure 2:
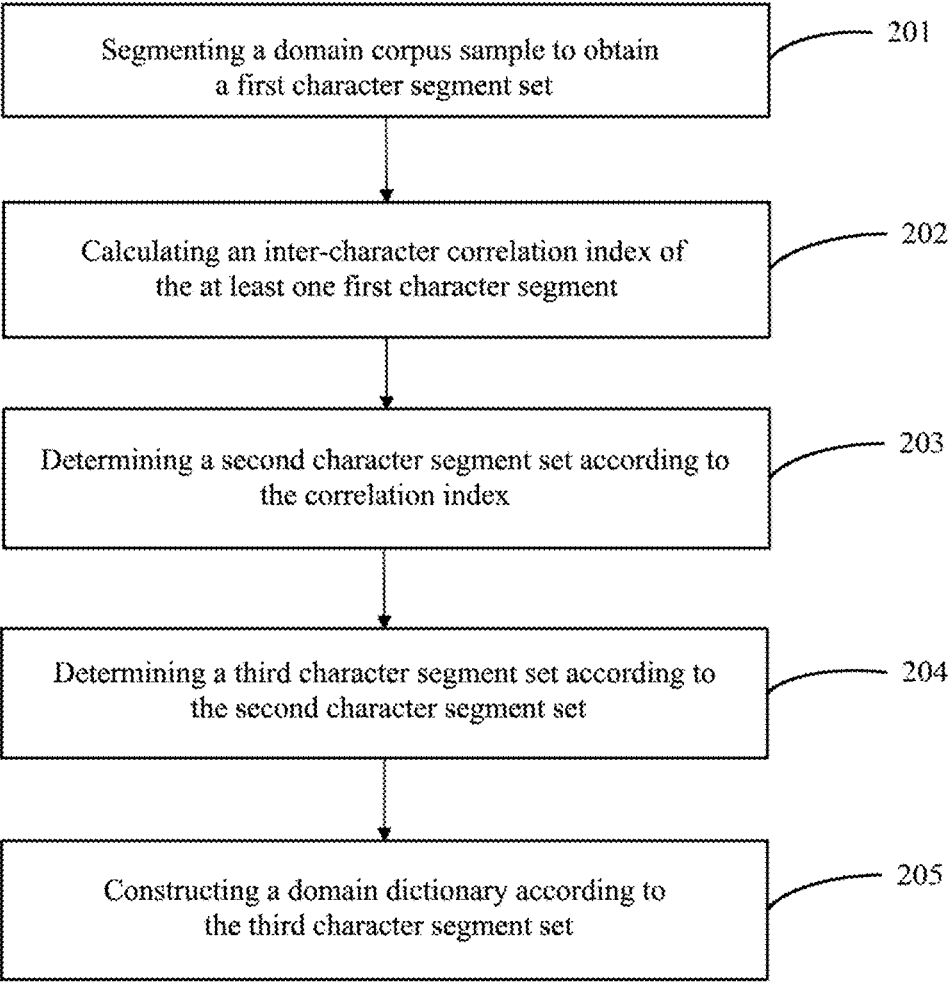
FIG. 2 is a flowchart of a domain dictionary constructing method provided by an embodiment of the present disclosure.

An embodiment of the present disclosure provides a domain dictionary constructing method. Refer to FIG. 2, FIG. 2 is a flowchart of a domain dictionary constructing method provided by the embodiment of the present disclosure. The method can be applied to an electronic device, such as a terminal (e.g. a mobile terminal, a computer, etc.) or a server. As shown in FIG. 2, the domain dictionary constructing method provided by the embodiment of the present disclosure includes following steps.

Step 201, segmenting a domain corpus sample to obtain a first character segment set, where the first character segment set includes at least one first character segment.

In the present embodiment, the domain corpus sample can be understood as a corpus sample or text with domain characteristic. For example, for the construction of a dictionary in the medical field, the domain corpus sample can be a corpus sample in the medical field; for the construction of a dictionary in the financial field, the domain corpus sample can be a corpus sample in the financial field. In a practical application, a dictionary can be constructed for a specific field and a large quantity of corpus samples of the field can be collected. That is to say, the quantity of domain corpus samples is usually large, such as 500 or more or 1000 or more, etc.

The segmentation is performed on the domain corpus sample to obtain the first character segment set, in which, the segmentation length of the domain corpus sample can be reasonably set according to needs. For example, the segmentation length can include 1, 2, 3, and 4, and correspondingly, segmentation can be performed to obtain 1-character segments, 2-character segments, 3-character segments, and 4-character segments, respectively, that is to say, the first character segment set can include the 1-character segments, 2-character segments, 3-character segments, and 4-character segments. Or, the segmentation length can include 2 and 3, and correspondingly, segmentation can be performed to obtain 2-character segments and 3-character segments, respectively, that is to say, the first character segment set can include the 2-character segments and 3-character segments. It can be understood that the first character segment set includes the character segment(s) segmented from each domain corpus sample.

Illustratively, a n-gram model can be used to segment each domain corpus sample to obtain the first character segment set, and the first character segment set includes the character segment(s) segmented from each domain corpus sample. A value of the n can be reasonably set according to actual needs. For example, the value of the n can be 1, 2, 3, and 4 respectively, that is, 1-gram, 2-gram, 3-gram, and 4-gram are used to segment the domain corpus sample respectively, and then 1-character segments, 2-character segments, 3-character segments, and 4 characters segments are obtained; alternatively, the value of the n can be 1, 2, 3, 4 and 5, respectively, that is, 1-gram, 2-gram, 3-gram, 4-gram, and 5-gram are used to segment the domain corpus sample respectively, and then 1-character segments, 2-character segments, 3-character segments, 4-character segments, and 5-character segments are obtained.

It should be noted that the 1-character segment can be understood as a segment containing 1 character, the 2-character segment can be understood as a segment containing 2 characters, the 3-character segment can be understood as a segment containing 3 characters, the 4-character segment can be understood as a segment containing 4 characters, the 5-character segment can be understood as a segment containing 5 characters, and so on.

Step 202, calculating an inter-character correlation index of the at least one first character segment.

In the present embodiment, the correlation index is used to indicate a correlation between characters in the first character segment.

It can be understood that in the case where there are multiple first character segments in the first character segment set, the above step 202 can be understood as calculating the inter-character correlation index of each first character segment in the first character segment set respectively.

In some embodiments, the step 202 can be understood as calculating the inter-character correlation index of each first character segment with a length greater than 1 character in the first character segment set.

Illustratively, a probability of occurrence or a number of occurrences of each first character segment in the first character segment set and a probability of occurrence or a number of occurrences of each sub-segment obtained by dividing the first character segment may be counted respectively, and then, the inter-character correlation index of the first character segment can be calculated respectively according to the probability of occurrence or the number of occurrences of each first character segment and the probability of occurrence or the number of occurrences of each sub-segment obtained by dividing the first character segment. The probability of occurrence can be understood as a ratio of the number of occurrences to a total number of character segments in the first character segment set.

It can be understood that the stronger the correlation between the characters of the first character segment, the higher a probability that the first character segment is a word.

Step 203, determining a second character segment set according to the correlation index, where the second character segment set includes a first character segment of which the correlation index is greater than or equal to a preset threshold.

It can be understood that the above step 203 may be understood as the second character segment set is determined according to the inter-character correlation index of each first character segment in the first character segment set, the second character segment set includes the first character segment(s) in the first character segment set which has a correlation index greater than or equal to a corresponding preset threshold.

The preset threshold may be reasonably set according to actual needs. In some embodiments, all of the first character segments of the first character segment set may correspond to a same preset threshold. In some embodiments, character segments with a same length in the first character segment set may correspond to a same preset threshold, and character segments with different lengths in the first character segment set may correspond to different preset thresholds.

Illustratively, the correlation index of each first character segment of the first character segment set may be compared with the corresponding preset threshold thereof respectively, and if the correlation index of a first character segment is greater than or equal to the corresponding preset threshold thereof, the first character segment may be added into the second character segment set, where the initial second character segment set is an empty set.

Step 204, determining a third character segment set according to the second character segment set, where the third character segment set includes the second character segment set and second character segments of the domain corpus sample, where each of the second character segments is a character segment that is the same as a character segment obtained by combining at least two character segments of the second character segment set.

In an implementation, if the maximum segmentation length adopted in the step 201 is a first segmentation length, a plurality of second segmentation lengths greater than the first segmentation length may be adopted respectively to segment each domain corpus sample to obtain character segments with different lengths. In an implementation the minimum second segmentation length of the plurality of second segmentation lengths may be the first segmentation length plus 1, and the maximum second segmentation length of the plurality of second segmentation lengths may be reasonably set according to actual needs, for example, it may be the length of the domain corpus sample, or it may be a preset value (e.g., 5, 6, or 7, etc.). The character segments obtained by segmenting with the plurality of second segmentation lengths can be matched with the character segment obtained by combining any plurality of first character segments in the second character segment set, and a character segment that is successfully matched (i.e., the character segment that is the same as the character segment obtained by combining a plurality of first character segments) in the character segments obtained by segmenting with the plurality of second segmentation lengths can be added into the third character segment set.

In another implementation, any plurality of first character segments in the second character segment set can be combined respectively, and each character segment obtained by combing can be matched with the each domain corpus sample, if, a certain domain corpus sample has a character segment that is the same as a character segment obtained by combing, the character segment can be added to the third character segment set.

For example, if the second character segment set includes {世界杯 (which means World Cup), 足球 (which means football), 足球队 (which means football team), 大力神杯 (which means FIFA World Cup trophy), 足联 (which means football association)}, and a certain domain corpus sample is: 足球世界杯欢迎您的加入 (which means Football World Cup welcomes you to join), then for a character segment "足球世界杯" (which means "Football World Cup") in that domain corpus sample, it is the same as the character segment obtained by combining "足球" (which means "football") and "世界杯" (which means "World Cup") in the second character segment set, then "Football World Cup" can be added into the third character segment set as a second character segment.

It should be noted that when a plurality of first character segments is combined, same parts in the plurality of first character segments need to be deduplicated. For example, if the second character segment set includes {脑理疗仪 (which means brain physiotherapy instrument), 理疗仪器 (which means physiotherapy instrument and equipment), 白细胞病 (which means white blood cell disease), 细胞病变 (which means cell disease lesion), 非转基因 (which means non-transgenic), 转基因 (which means transgenic}, then the character segment obtained by combining "脑理疗仪" (which means "brain physiotherapy instrument") and "理疗仪器" (which means "physiotherapy instrument and equipment") is "脑理疗仪器" (which means "brain physiotherapy instrument and equipment").

Step 205, constructing a domain dictionary according to the third character segment set.

Illustratively, the character segments in the third character segment set may be directly utilized to construct the domain dictionary, i.e., the character segments in the third character segment set are used as domain words in the domain dictionary; or, filtering processing may be performed on the character segments in the third character segment set, and the domain dictionary may be constructed based on the character segments in the third character segment set obtained after the filtering processing, i.e., the character segments in the third character segment set obtained after filtering may be used as domain words in the domain dictionary.

In the domain dictionary constructing method provided by the embodiments of the present disclosure, a domain corpus sample is segmented to obtain a first character segment set, which includes at least one first character segment; an inter-character correlation index of the at least one first character segment is calculated; a second character segment set is determined according to the correlation index, where the second character segment set includes a first character segment of which the correlation index is greater than or equal to a preset threshold; a third character segment set is determined according to the second character segment set, where the third character segment set includes the second character segment set and second character segments of the domain corpus sample, where each of the second character segments is a character segment that is the same as a character segment obtained by combining at least two character segments of the second character segment set; a domain dictionary is constructed according to the third character segment set. As can be seen from the above, the embodiment of the present application can achieve mining and construction for the domain dictionary without an accumulation of domain words and manual annotations for domain words, which is not only relatively simple to implement but also improves an efficiency of constructing the domain dictionary. In addition, by performing filtering processes such as calculating the inter-character correlation index of each first character segment and comparing them with the preset threshold(s), an accuracy of mined domain words can be ensured. Moreover, by taking a character segment of the domain corpus sample that is the same as a character segment obtained by combining at least two character segments of the second character segment set also as the mined domain word, the domain words mined from the domain corpus sample can be expanded and an omission of domain words in the domain corpus sample can be reduced.

In an implementation, calculating the inter-character correlation index of the first character segment includes:

calculating a sub correlation index of each sub-segment set of the first character segment, where the sub-segment set includes at least two sub-segments in the first character segment;

calculating the inter-character correlation index of the first character segment according to the sub correlation index.

It can be understood that the inter-character correlation index of each first character segment in the first character segment set can be calculated by using the correlation index calculation manner provided by the embodiment. In addition, each sub-segment set of the first character segment includes at least two sub-segments in the first character segment, and different sub-segment sets include different sub-segments.

In an implementation, the at least two sub-segments included in each sub-segment set of the first character segment can be combined to obtain the first character segment. For example, for a first character segment "abc", corresponding sub-segment sets thereof may include such two sets as {a, bc} and {ab, c}; for a first character segment "abcd", corresponding sub-segment sets thereof may include such four sets as {a, bcd}, {ab, cd}, and {abc, d}.

Illustratively, the probability of occurrence of each first character fragment segment in the first character segment set and the probability of occurrence of each sub-segment in each sub-segment set of each first character segment may be calculated respectively, and then the sub correlation index of the first character segment under each sub-segment set can be calculated based on the probability of occurrence of each first character segment and the probability of occurrence of each sub-segment in each sub-segment set of each first character segment. For example, the sub correlation index of the first character segment under each sub-segment set can be calculated based on the following formula:

$$P_{ik} = \log_2\left(\frac{p(i)}{\prod_{j=1}^{J_k} p(j)}\right)$$

where p(i) represents a probability of occurrence of an i-th first character segment of the first character segment set in the first character segment set, $J_k$ represents a number of sub-segments of a k-th sub segment set of the i-th first character segment, p(j) represents a number of occurrences of a j-th sub segment of the k-th sub-segment set in the first character segment set, and $P_{ik}$ represents a sub correlation index of the k-th sub-segment set of the i-th first character segment, where i and k are both positive integers.

After obtaining the sub correlation index of each sub-segment set of the first character segment, the inter-character correlation index of the first character segment can be determined based on the sub correlation indexes of the first character segment, for example, an average sub correlation index of the sub correlation indexes can be determined as the correlation index of the first character segment, or a median sub correlation index of the sub correlation indexes can be determined as the correlation index of the first character segment, or, a minimum sub correlation index of the sub correlation indexes can be determined as the correlation index of the first character segment, and so on.

For example, for the first character segment "abc", the corresponding sub-segment sets thereof include such two sets as {a, bc} and {ab, c}, then the sub correlation indexes of the sub-segment set {a, bc} and the sub-segment set {ab, c} can be calculated respectively, and the minimum sub correlation index of the sub correlation index under the sub-segment set {a, bc} and the sub correlation index under the sub-segment set {ab, c} can be taken as the correlation index of the first character segment "abc".

Embodiments of the present disclosure determine the correlation index of the first character segment by respectively calculating the sub correlation index of each sub-segment set of each first character segment and respectively calculating the correlation index of each first character segment according to the sub correlation index of each sub-segment set of each first character segment, i.e., synthesizing sub correlation indexes of the sub-segment sets of the first character segment. It is beneficial to ensuring that the determined correlation index of the first character segment can reflect the correlation between the characters of the first character segment more objectively and accurately.

In an implementation, the calculating the sub correlation index of each sub-segment set of the first character segment includes:

calculating the sub correlation index of each sub-segment set of the first character segment based on a first calculating formula, as follows:

$$P_{ik} = \frac{NUM(i)}{\prod_{j=1}^{J_k} NUM(j)}$$

where NUM(i) represents a number of occurrences or a probability of occurrence of an i-th first character segment of the first character segment set in the first character segment set, $J_k$ represents a number of sub-segments of a k-th sub-segment set of the i-th first character segment, NUM(j) represents a number of occurrences or a probability of occurrence of a j-th sub-segment of the k-th sub-segment set in the first character segment set, $P_{ik}$ represents a sub correlation index of the k-th sub-segment set of the i-th first character segment, where i and k are both positive integers.

For example, if the i-th first character segment of the first character segment set is "abc", NUM(i) represents the number of occurrences or probability of occurrence of the first character segment "abc" in the first character segment set, and the first character segment "abc" includes two sub-segment sets, namely {a, bc} and {ab, c}, then the values of the k are 1 and 2 respectively, $J_1$ represents the number of sub-segments of the first sub-segment set {a, bc}, and $J_2$ represents the number of sub-segments of the second sub-segment set {ab, c}, for k=1, NUM(j) represents the number of occurrences or probability of occurrence of sub-segments {a} and {bc} in the first character segment set, and for k=2, NUM(j) represents the number of occurrences or probability of occurrence of sub-segments {ab} and {c} in the first character segment set.

Embodiments of the present disclosure calculate the sub correlation index of each sub-segment set of each first character segment based on the first calculating formula, that is, which comprehensively considers the number of occurrences or the probability of occurrence of the first character segment and calculates the sub correlation index based on the number of occurrences or the probability of occurrence of each sub-segment in the sub-segment set of the first character segment. This not only simplifies the implementation, but also ensures that the correlation index of the first character segment obtained by calculating can accurately reflect the correlation between characters of the first character segment.

In an implementation, calculating the inter-character correlation index of the first character segment according to the sub correlation index includes:

determining a minimum sub correlation index as the inter-character correlation index of the first character segment.

In the present embodiment, after calculating the sub correlation index of each sub-segment set of the first character segment, the minimum sub correlation index can be determined as the inter-character correlation index of the first character segment.

For example, if the sub correlation index of the first sub-segment set {a, bc} of the first character segment "abc"

is $P_1$, and the sub correlation index of the second sub-segment set {ab, c} of the first character segment "abc" is $P_2$, it can be determined that the correlation index of the first character segment "abc" is the smaller of $P_1$ and $P_2$.

Illustratively, the inter-character correlation index of the first character segment can be calculated based on a second calculation formula:

$$P_i = \min\left\{P_{ik} = \frac{NUM(i)}{\prod_{j=1}^{J_k} NUM(j)}, J_k \in I\right\}$$

where NUM(i) represents a number of occurrences or a probability of occurrence of an i-th first character segment of the first character segment set in the first character segment set, I represents a number of sub-segment sets obtained by dividing the i-th first character segment, and each sub-segment set includes at least two sub-segments obtained by dividing the i-th first character segment, $J_k$ represents a k-th sub-segment set of the i-th first character segment, NUM(j) represents a number of occurrences of a j-th sub-segment of the k-th sub-segment set in the first character segment set, $P_{ik}$ represents a sub correlation index of the i-th first character segment under the k-th sub-segment set, where min represents taking the minimum.

The present embodiment respectively determines the minimum sub correlation index in all sub correlation indexes of respective sub-segment sets of each first character segment as the inter-character correlation index of each first character segment. In this way, when comparing the correlation index with the corresponding preset threshold for filtering the first character segment, if the minimum sub correlation index meets the corresponding preset threshold, it can be ensured that the first character segment obtained after filtering has a high probability of being a word.

In an implementation, segmenting the domain corpus sample to obtain the first character segment set includes:

segmenting the domain corpus sample by using different segmentation lengths, respectively, to obtain the first character segment set;

where first character segments in different lengths correspond to different preset thresholds.

The inventors of the present disclosure have found that when the lengths of the character segments are different, distribution of correlation indexes is usually different. The present embodiment sets different preset thresholds for character segments in different lengths, which is conducive to accurate filtering to obtain character segments with a relatively high probability of being a word.

In an implementation, the preset threshold corresponding to the first character segment is positively correlated with the length of the first character segment.

The preset threshold corresponding to the first character segment being positively correlated with the length of the first character segment can be understood as that the longer the length of the first character segment, the larger the preset threshold corresponding to the first character segment, the shorter the length of the first character segment, the smaller the preset threshold corresponding to the first character segment.

For example, the preset threshold corresponding to a 2-character segment is less than the preset threshold corresponding to a 3-character segment, the preset threshold corresponding to a 3-character segment is less than the preset threshold corresponding to a 4-character segment, and so on.

The inventors of the present disclosure found that the longer the length of a character segment, the higher the probability of the correlation index being great. Therefore, in the present embodiment, for the first character segment in a longer length, the corresponding preset threshold is set to be larger, which is conducive to accurately obtaining character segments with a relatively high probability of being a word after filtering.

In an implementation, the segmenting the domain corpus sample by using different segmentation lengths respectively to obtain the first character segment set includes:

> segmenting each domain corpus sample by using a 1-gram model, a 2-gram model, a 3-gram model, and a 4-gram model, respectively, to obtain the first character segment set.

The inventors of the present disclosure have found that the length of a word is usually 1 to 4. Therefore, the embodiments of the present disclosure use a 1-gram model, a 2-gram model, a 3-gram model, and a 4-gram model to segment each domain corpus sample of the plurality of domain corpus samples to obtain the first character segment set, which not only ensures that the first character segment set can cover the vast majority of domain words in the plurality of domain corpus samples, but also reduces a number of interfering words, which is conducive to improving an accuracy of the mined domain words and can also reduce processing load and improve processing efficiency.

In an implementation, a maximum segmentation length for the domain corpus sample is L, where L is a positive integer; the constructing the domain dictionary according to the third character segment set includes:

> deleting third character segments from the third character segment set, where each of the third character segments satisfies any one of the following conditions: having a length less than or equal to L and not belonging to the second character segment set; having a length greater than L and at least one of at least two L character segments obtained by segmenting with the maximum segmentation length not belonging to the second character segment set;
>
> constructing the domain dictionary according to the third character segment set after deleting the third character segments.

In the present embodiment, the maximum segmentation length of the domain corpus sample can be reasonably set according to actual needs, for example, L is 3 or 4.

For each character segment in the third character segment set, if the character segment satisfies any one of the following conditions, it can be deleted from the third character segment set:

> having a length less than or equal to L and not belonging to the second character segment set;
>
> having a length greater than L and at least one of at least two L character segments obtained by segmenting with the maximum segmentation length not belonging to the second character segment set.

Taking L equal to 4 as an example, the second character segment set includes { 世界杯 (which means World Cup), 足球 (which means football), 足球队 (which means football team), 大力神杯 (which means FIFA World Cup trophy), 足联 (which means football association)}, and for the character segment " 足球世界杯 " (which means "Football World Cup") in the third character segment set, 4-character segments obtained by segmenting with 4-gram includes " 足球世界 " (which means "Football World") and " 球世界杯 " (which means "Ball World Cup"). Since " 足球世界 " (which means "Football World") and " 球世界杯 " (which means "Ball World Cup") both do not belong to the second character segment set, the character segment " 足球世 界杯 " (which means "Football World Cup") needs to be deleted from the third character segment set.

For another example, the second character segment set includes: { 脑理疗仪 (which means brain physiotherapy instrument), 理疗仪器 (which means physiotherapy instrument and equipment), 白细胞病 (which means white blood cell disease), 细胞 病变 (which means cell disease lesion), 非转基因 (which means non-transgenic), 转 基因 (which means transgenic)}, and for the character segment " 脑理疗仪器 " (which means "brain physiotherapy instrument and equipment") in the third character segment set, 4-character segments obtained by segmenting with 4-gram include " 脑理疗仪 " (which means "brain physiotherapy instrument") and " 理疗仪器 " (which means "physiotherapy instrument and equipment"), since both " 脑理疗仪 " (which means "brain physiotherapy instrument") and " 理疗仪器 " (which means "physiotherapy instrument and equipment") belong to the second character segment set, the character segment " 脑理疗仪器 " (which means "brain physiotherapy instrument and equipment") is retained in the third character segment set; for the character segment " 白细胞病变 " (which means "white blood cell disease lesion") in the third character segment set, 4-character segments obtained by segmenting with 4-gram include " 白细胞病 " (which means "white blood cell disease") and " 细胞病变 " (which means "cell disease lesion"), since both " 白细胞病 " (which means "white blood cell disease") and " 细胞病变 " (which means "cell disease lesion") belong to the second character segment set, the character segment " 白细胞病变 " (which means "white blood cell disease lesion") is retained in the third character segment set.

The embodiments of the present disclosure delete the third character segments from the third character segment set and construct the domain dictionary according to the third character segment set after deleting the third character segments, thereby further improving an accuracy of the mined domain words As can be seen from the above, the domain dictionary constructing method provided by the embodiments of the present disclosure realizes the construction of the domain dictionary by segmenting the domain corpus sample (e.g., segmenting the domain corpus sample based on the n-gram model), calculating a correlation index, judging the threshold (i.e., obtaining the first character segment that the correlation index of the first character segment is greater than or equal to the corresponding preset threshold), matching the character segment (i.e., determining the third character segment set according to the second character segment set), and filtering the character segments (i.e., deleting the third character segments from the third character segment set), etc., which has advantages of relatively simple implementation and high efficiency, and can save a lot of labor power and material resources, and realize the construction of the domain dictionary at a low cost. In addition, the embodiments of the present disclosure provide the method of calculating the correlation index combined with portions of the threshold judgment and the character segment filtering, which can improve a quality or an accuracy of the domain dictionary. Furthermore, the embodiments of the present disclosure provide a portion of the character segment matching, which can mine to obtain a character segment with a length greater than the maximum length of the character segments in the first character segment set, and reduce the omission of domain words.

Figure 3:
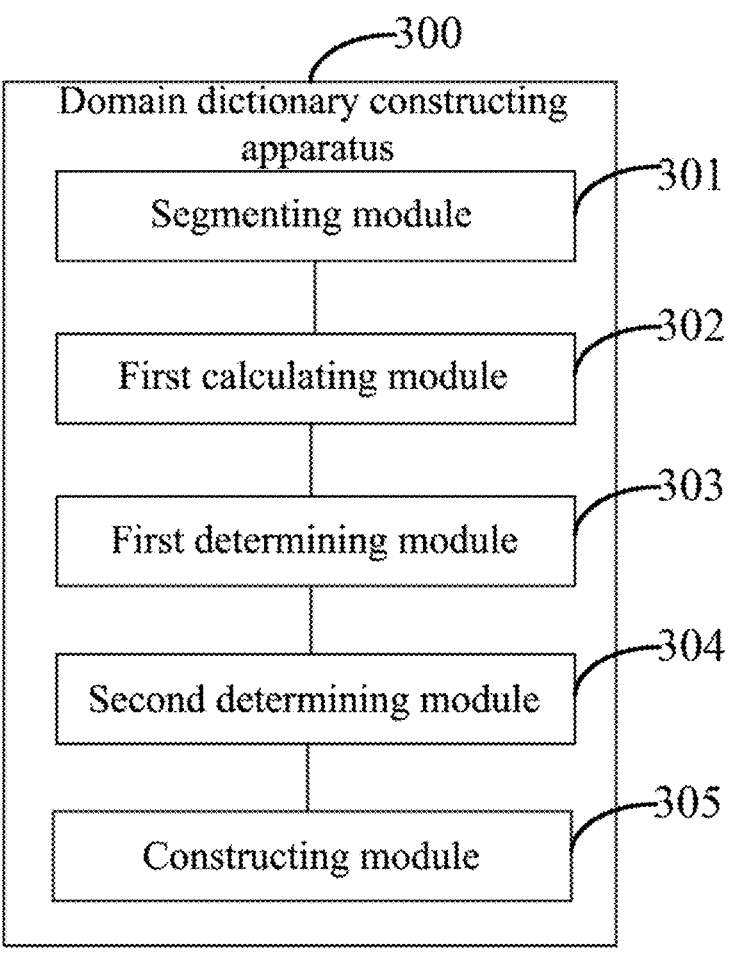
FIG. 3 is a structural diagram of a domain dictionary constructing apparatus provided by an embodiment of the present disclosure.

Referring to FIG. 3, FIG. 3 is a structural diagram of a domain dictionary constructing apparatus provided by an embodiment of the present disclosure. As shown in FIG. 3, the domain dictionary constructing apparatus 300 includes:

a segmenting module 301, configured to segment a domain corpus sample to obtain a first character segment set, where the first character segment set includes at least one first character segment;

a first calculating module 302, configured to calculate an inter-character correlation index of the at least one first character segment;

a first determining module 303, configured to determine a second character segment set according to the correlation index, where the second character segment set includes a first character segment of which the correlation index is greater than or equal to a preset threshold;

a second determining module 304, configured to determine a third character segment set according to the second character segment set, where the third character segment set includes the second character segment set and second character segments of the domain corpus sample, where each of the second character segments is a character segment that is the same as a character segment obtained by combining at least two character segments of the second character segment set;

a constructing module 305, configured to construct a domain dictionary according to the third character segment set.

In an implementation, the first calculating module includes:

a first calculating unit, configured to calculate a sub correlation index of each sub-segment set of the first character segment, where the sub-segment set includes at least two sub-segments in the first character segment;

a second calculating unit, configured to calculate the inter-character correlation index of the first character segment according to the sub correlation index.

In an implementation, the first calculating unit is specifically configured to: calculate the sub correlation index of each sub segment set of the first character segment based on a first calculating formula:

$$P_{ik} = \frac{NUM(i)}{\prod_{j=1}^{J_k} NUM(j)}$$

where NUM(i) represents a number of occurrences or a probability of occurrence of an i-th first character segment of the first character segment set in the first character segment set, $J_k$ represents a number of sub-segments of a k-th sub-segment set of the i-th first character segment, NUM(j) represents a number of occurrences or a probability of occurrence of a j-th sub-segment of the k-th sub-segment set in the first character segment set, $P_{ik}$ represents a sub correlation index of the k-th sub segment set of the i-th first character segment, where i and k are both positive integers.

In an implementation, the second calculating unit is specifically configured to:

determine a minimum sub correlation index as the inter-character correlation index of the first character segment.

In an implementation, the segmenting module is specifically configured to: segment the domain corpus sample by using different segmentation lengths, respectively, to obtain the first character segment set;

where first character segments in different lengths correspond to different preset thresholds.

In an implementation, the preset threshold corresponding to the first character segment is positively correlated with the length of the first character segment.

In an implementation, a maximum segmentation length of the domain corpus sample is L, where L is a positive integer; the constructing module is specifically configured to:

delete third character segments from the third character segment set, where each of the third character segments satisfies any one of the following conditions: having a length less than or equal to L and not belonging to the second character segment set; having a length greater than L and at least one of at least two L character segments obtained by segmenting with the maximum segmentation length not belonging to the second character segment set;

construct the domain dictionary according to the third character segment set after deleting the third character segments.

The domain dictionary constructing apparatus 300 provided by the embodiments of the present disclosure can realize each process in the above method embodiments, which will not be repeated herein to avoid repetition.

Figure 4:
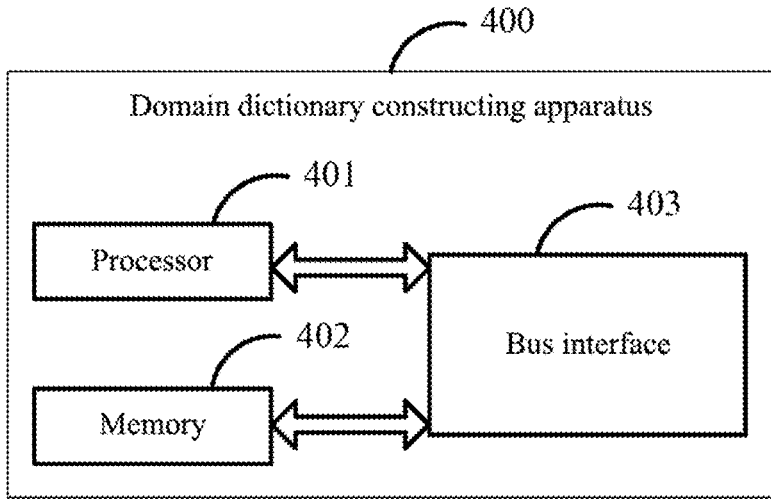
FIG. 4 is a structural diagram of a domain dictionary constructing apparatus provided by another embodiment of the present disclosure.

Referring to FIG. 4, FIG. 4 is a structural diagram of a domain dictionary constructing apparatus provided by another embodiment of the present disclosure. As shown in FIG. 4, the domain dictionary constructing apparatus 400 includes: a processor 401, a memory 402 and a computer program stored in the memory 402 and capable of running on the processor, each component in the domain dictionary construction apparatus 400 is coupled together through a bus interface 403, and when the computer program is executed by the processor 401, steps in following are implemented:

segmenting a domain corpus sample to obtain a first character segment set, where the first character segment set includes at least one first character segment;

calculating an inter-character correlation index of the at least one first character segment;

determining a second character segment set according to the correlation index, where the second character segment set includes a first character segment of which the correlation index is greater than or equal to a preset threshold;

determining a third character segment set according to the second character segment set, where the third character segment set includes the second character segment set and second character segments of the domain corpus sample, where each of the second character segments is a character segment that is the same as a character segment obtained by combining at least two character segments of the second character segment set;

constructing a domain dictionary according to the third character segment set.

It should be understood that in the embodiment of the present disclosure, the computer program can be executed by the processor 401 to implement each process in the above embodiments of the domain dictionary constructing method, which will not be repeated herein to avoid repetition.

An embodiment of the present disclosure also provides an electronic device, including a processor, a memory and a computer program stored in the memory and capable of running on the processor, when the computer program is executed by the processor, each process of the above domain dictionary constructing method embodiment is implemented and the same technical effect can be achieved, which will not be repeated herein to avoid repetition.

An embodiment of the present disclosure also provides a computer-readable storage medium, storing a computer program therein, when the computer program is executed by a processor, each process of the above domain dictionary constructing method embodiment is implemented and the same technical effect can be achieved, which will not be repeated herein to avoid repetition. The computer-readable storage medium may be a Read-Only Memory (Read-Only Memory, ROM), a Random Access Memory (Random Access Memory, RAM), a magnetic disk or an optical disk.

It should be noted that, terms "comprise," "include", or any other variation thereof used herein are intended to cover a non-exclusive inclusion, so that a process, method, item, or apparatus including a list of elements not only includes those elements, but also includes other elements which are not expressly listed, or includes elements inherent to the process, method, item, apparatus. In a case without further limitation, an element defined by a statement "comprises a . . . " does not exclude the presence of additional identical elements in the process, method, item, or apparatus including the element.

Through the above description of the embodiments, it is clear to those skilled in the art that the method provide in the above embodiments can be realized with the aid of software plus a necessary general-purpose hardware platform, or of course by means of hardware, but in many cases the former is a better implement manner. Based on the understanding, the technical solution of the present disclosure essentially, or a part contributing to the prior art, may be embodied in the form of a software product. The computer software product is stored in a storage medium (e.g., a ROM/RAM, a magnetic disk, an optical disk) and includes several instructions to cause a terminal (which may be a cellular phone, a computer, a server, an air-conditioning unit, or a networked device, etc.) to carry out the method described in each embodiment of the present disclosure.

The embodiments of the present disclosure are described above in conjunction with the accompanying drawings, but the present disclosure is not limited to the specific embodiments described above, the specific embodiments described above are merely illustrative and are not limiting, and persons of ordinary skill in the art of the present disclosure, under the inspiration of the present disclosure, without departing from the scope of the protection of the purpose of the present disclosure and the claims, may also make a lot of forms, which all belong to the protection of the present disclosure.

What is claimed is:

1. A domain dictionary constructing method, implemented by an electronic device, comprising:

providing, to an n-gram model, a domain corpus sample for segmenting the domain corpus sample to obtain a first character segment set, wherein the first character segment set comprises at least one first character segment;

calculating an inter-character correlation index of the at least one first character segment;

determining a second character segment set according to the correlation index, wherein the second character segment set comprises a first character segment of which the correlation index is greater than or equal to a preset threshold;

determining a third character segment set according to the second character segment set, wherein the third character segment set comprises the second character segment set and second character segments of the domain corpus sample, wherein each of the second character segments is a character segment that is the same as a character segment obtained by combining at least two character segments of the second character segment set;

constructing a domain dictionary according to the third character segment set; and using the domain dictionary for one or more of: domain classification, keyword extraction, construction of a knowledge graph, domain word expansion, and construction of domain word knowledge bases.

2. The method according to claim 1, wherein the calculating the inter-character correlation index of the first character segment comprises:

calculating a sub correlation index of each sub-segment set of the first character segment, wherein the sub-segment set comprises at least two sub-segments in the first character segment;

calculating the inter-character correlation index of the first character segment according to the sub correlation index.

3. The method according to claim 2, wherein the calculating the sub correlation index of each sub segment set of the first character segment comprises:

calculating the sub correlation index of each sub-segment set of the first character segment based on a first calculating formula:

$$P_{ik} = \frac{NUM(i)}{\prod_{j=1}^{J_k} NUM(j)}$$

wherein NUM(i) represents a number of occurrences or a probability of occurrence of a-th first character segment of the first character segment set in the first character segment set, $J_k$ represents a number of sub-segments of a-th sub-segment set of the-th first character segment, NUM(j) represents a number of occurrences or a probability of occurrence of an j-th sub-segment of the-th sub-segment set in the first character segment set, $P_{ik}$ represents a sub correlation index of the-th sub-segment set of the-th first character segment, wherein i and k are both positive integers.

4. The method according to claim 2, wherein the calculating the inter-character correlation index of the first character segment according to the sub correlation index comprises:

determining a minimum sub correlation index as the inter-character correlation index of the first character segment.

5. The method according to claim 1, wherein the segmenting the domain corpus sample to obtain the first character segment set comprises:

segmenting the domain corpus sample by using different segmentation lengths respectively to obtain the first character segment set.

6. The method according to claim 1, wherein a maximum segmentation length for the domain corpus sample is L, and L is a positive integer; wherein the constructing the domain dictionary according to the third character segment set comprises:

deleting third character segments from the third character segment set, wherein each of the third character segments satisfies any one of the following conditions: having a length less than or equal to L and not belonging to the second character segment set; having a length greater than L and at least one of at least two L character segments obtained by segmenting with the maximum segmentation length not belonging to the second character segment set;

constructing the domain dictionary according to the third character segment set after deleting the third character segments.

7. An electronic device, comprising: a processor, a memory and a computer program stored in the memory and capable of running on the processor, wherein the computer program, when executed by the processor, causes the processor to:

provide, to an n-gram model, a domain corpus sample for segmenting the domain corpus sample to obtain a first character segment set, wherein the first character segment set comprises at least one first character segment;

calculate an inter-character correlation index of the at least one first character segment;

determine a second character segment set according to the correlation index, wherein the second character segment set comprises a first character segment of which the correlation index is greater than or equal to a preset threshold;

determine a third character segment set according to the second character segment set, wherein the third character segment set comprises the second character segment set and second character segments of the domain corpus sample, wherein each of the second character segments is a character segment that is the same as a character segment obtained by combining at least two character segments of the second character segment set;

construct a domain dictionary according to the third character segment set; and use the domain dictionary for one or more of: domain classification, keyword extraction, construction of a knowledge graph, domain word expansion, and construction of domain word knowledge bases.

8. The electronic device according to claim 7, wherein the computer program further causes the processor to:

calculate a sub correlation index of each sub-segment set of the first character segment, wherein the sub-segment set comprises at least two sub-segments in the first character segment;

calculate the inter-character correlation index of the first character segment according to the sub correlation index.

9. The electronic device according to claim 8, wherein the computer program further causes the processor to:

calculate the sub correlation index of each sub-segment set of the first character segment based on a first calculating formula:

$$P_{ik} = \frac{NUM(i)}{\prod_{j=1}^{J_k} NUM(j)}$$

wherein NUM(i) represents a number of occurrences or a probability of occurrence of a-th first character segment of the first character segment set in the first character segment set, $J_k$ represents a number of sub-segments of a-th sub-segment set of the-th first character segment, NUM(j) represents a number of occurrences or a probability of occurrence of an j-th sub-segment of the-th sub-segment set in the first character segment set, $P_{ik}$ represents a sub correlation index of the-th sub segment set of the-th first character segment, wherein i and k are both positive integers.

10. The electronic device according to claim 8, wherein the computer program further causes the processor to:

determine a minimum sub correlation index as the inter-character correlation index of the first character segment.

11. The electronic device according to claim 7, wherein the computer program further causes the processor to:

segment the domain corpus sample by using different segmentation lengths respectively to obtain the first character segment set.

12. The electronic device according to claim 7, wherein a maximum segmentation length for the domain corpus sample is L, and L is a positive integer; wherein the computer program further causes the processor to:

delete third character segments from the third character segment set, wherein each of the third character segments satisfies any one of the following conditions: having a length less than or equal to L and not belonging to the second character segment set; having a length greater than L and at least one of at least two L character segments obtained by segmenting with the maximum segmentation length not belonging to the second character segment set;

construct the domain dictionary according to the third character segment set after deleting the third character segments.

13. A non-transitory computer-readable storage medium, storing a computer program therein, wherein the computer program, when executed by a processor of an electronic device, causes the processor to execute following operations:

providing, to an n-gram model, a domain corpus sample for segmenting the domain corpus sample to obtain a first character segment set, wherein the first character segment set comprises at least one first character segment;

calculating an inter-character correlation index of the at least one first character segment;

determining a second character segment set according to the correlation index, wherein the second character segment set comprises a first character segment of which the correlation index is greater than or equal to a preset threshold;

determining a third character segment set according to the second character segment set, wherein the third character segment set comprises the second character segment set and second character segments of the domain corpus sample, wherein each of the second character segments is a character segment that is the same as a character segment obtained by combining at least two character segments of the second character segment set;

constructing a domain dictionary according to the third character segment set; and using the domain dictionary for one or more of: domain classification, keyword extraction, construction of a knowledge graph, domain word expansion, and construction of domain word knowledge bases.

14. The non-transitory computer-readable storage medium according to claim 13, wherein the computer program further causes the processor to execute following operations:

calculating a sub correlation index of each sub-segment set of the first character segment, wherein the sub-segment set comprises at least two sub-segments in the first character segment;

calculating the inter-character correlation index of the first character segment according to the sub correlation index.

15. The non-transitory computer-readable storage medium according to claim 14, wherein the computer program further causes the processor to execute following operation:

calculating the sub correlation index of each sub-segment set of the first character segment based on a first calculating formula:

$$P_{ik} = \frac{NUM(i)}{\prod_{j=1}^{J_k} NUM(j)}$$

wherein NUM(i) represents a number of occurrences or a probability of occurrence of a-th first character segment of the first character segment set in the first character segment set, $J_k$ represents a number of sub-segments of a-th sub-segment set of the-th first character segment, NUM(j) represents a number of occurrences or a probability of occurrence of an j-th sub-segment of the-th sub-segment set in the first character segment set, $P_{ik}$ represents a sub correlation index of the-th sub segment set of the-th first character segment, wherein i and k are both positive integers.

16. The non-transitory computer-readable storage medium according to claim 14, wherein the computer program further causes the processor to execute following operation:

determining a minimum sub correlation index as the inter-character correlation index of the first character segment.

17. The non-transitory computer-readable storage medium according to claim 13, wherein the computer program further causes the processor to execute following operation:

segmenting the domain corpus sample by using different segmentation lengths respectively to obtain the first character segment set.

18. The non-transitory computer-readable storage medium according to claim 13, wherein a maximum segmentation length for the domain corpus sample is L, and L is a positive integer; wherein the computer program further causes the processor to execute following operations:

deleting third character segments from the third character segment set, wherein each of the third character segments satisfies any one of the following conditions: having a length less than or equal to L and not belonging to the second character segment set; having a length greater than L and at least one of at least two L character segments obtained by segmenting with the maximum segmentation length not belonging to the second character segment set;

constructing the domain dictionary according to the third character segment set after deleting the third character segments.

\*    \*    \*    \*    \*